US010835949B2

(12) United States Patent
Vargas et al.

(10) Patent No.: US 10,835,949 B2
(45) Date of Patent: Nov. 17, 2020

(54) PHENOLIC RESIN COMPOSITION FOR USE IN THE POLYURETHANE COLD-BOX AND/OR NO-BAKE PROCESS AND CORRESPONDING TWO-COMPONENT BINDER SYSTEMS, USES, AND PROCESSES

(71) Applicant: HÜTTENES-ALBERTUS CHEMISCHE WERKE GESELLSCHAFT MIT BESCHRÄNKTER HAFTUNG, Düsseldorf (DE)

(72) Inventors: Manuel Vargas, Pont-Sainte-Maxence (FR); Tung-Fai Lo, Angicourt (FR)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 0 days.

(21) Appl. No.: 15/566,416

(22) PCT Filed: Mar. 21, 2016

(86) PCT No.: PCT/EP2016/056120
§ 371 (c)(1),
(2) Date: Oct. 13, 2017

(87) PCT Pub. No.: WO2016/165916
PCT Pub. Date: Oct. 20, 2016

(65) Prior Publication Data
US 2018/0126449 A1 May 10, 2018

(30) Foreign Application Priority Data
Apr. 14, 2015 (EP) .................................... 15305547

(51) Int. Cl.
B22C 1/22 (2006.01)
C08G 18/54 (2006.01)
C08L 61/06 (2006.01)
C08G 18/76 (2006.01)
C08G 8/10 (2006.01)

(52) U.S. Cl.
CPC .......... B22C 1/2253 (2013.01); B22C 1/2273 (2013.01); C08G 8/10 (2013.01); C08G 18/542 (2013.01); C08G 18/7664 (2013.01); C08L 61/06 (2013.01)

(58) Field of Classification Search
None
See application file for complete search history.

(56) References Cited

U.S. PATENT DOCUMENTS

| | | | | |
|---|---|---|---|---|
| 3,409,579 A * | 11/1968 | Robins | .................. | B22C 1/2253 164/16 |
| 3,485,797 A * | 12/1969 | Robins | .................... | C07C 37/20 524/702 |
| 3,676,392 A * | 7/1972 | Robins | ...................... | C08G 8/04 524/442 |
| 4,213,785 A * | 7/1980 | Blanc | ....................... | B22C 1/188 106/38.35 |
| 4,273,179 A * | 6/1981 | Gardikes | ............... | B22C 1/2273 164/521 |
| 4,363,665 A * | 12/1982 | Barrier | ...................... | B22C 1/18 106/38.3 |
| 4,436,844 A * | 3/1984 | Schroeder | ................. | B22C 1/20 523/144 |
| 4,474,904 A * | 10/1984 | Lemon | ................... | B22C 1/2253 523/146 |
| 4,481,310 A * | 11/1984 | Woodson | .............. | B22C 1/2233 523/144 |
| 4,529,807 A * | 7/1985 | Woodson | .............. | B22C 1/2233 523/144 |
| 4,862,948 A * | 9/1989 | Laitar | ................... | C08K 5/0025 164/526 |
| 5,160,503 A * | 11/1992 | Smith | .................... | B27N 1/003 252/182.24 |
| 5,470,924 A * | 11/1995 | Ryan | ........................ | C08G 8/10 525/501 |

(Continued)

FOREIGN PATENT DOCUMENTS

| | | |
|---|---|---|
| CN | 104114614 | 10/2014 |
| DE | 102004057671 | 6/2006 |
| WO | 02/02232 | 3/2002 |

Primary Examiner — Peter A Salamon
(74) Attorney, Agent, or Firm — Duane Morris LLP; Gregory M. Lefkowitz

(57) ABSTRACT

Described is a phenolic resin composition for use in the polyurethane cold-box and/or no-bake process. The phenolic resin composition comprises an ortho-condensed phenolic resol having etherified and/or free methylol groups in a total amount of 40 to 60% by weight based on the total mass of the phenolic resin composition, free formaldehyde in an amount of less than 0.1% by weight based on the total weight of the phenolic resin composition, one or more reaction products of formaldehyde with one or more C—H-acidic reactant compounds, other constituents in a total amount of at least 38% by weight, wherein the amount of water in the phenolic resin composition is not more than 1.0% by weight in each case based on the total mass of the phenolic resin composition. Also described is a two-component binder system for use in the polyurethane cold-box and/or no-bake process, a use of a C—H-acidic compound as a formaldehyde scavenger for producing a phenolic resin composition for use in the polyurethane cold-box and/or no-bake process, a process for producing a phenolic resin composition, a process for producing a two-component binder system and a process for producing a feeder, a foundry mold or a foundry core from a molding material mixture and finally corresponding feeders, foundry molds and foundry cores.

19 Claims, No Drawings

(56) References Cited

U.S. PATENT DOCUMENTS

| | | | | |
|---|---|---|---|---|
| 5,552,488 A | * | 9/1996 | Bradford | C08G 12/40 525/123 |
| 5,795,933 A | * | 8/1998 | Sharp | C08K 5/10 524/596 |
| 6,465,542 B1 | * | 10/2002 | Torbus | B22C 1/2273 523/142 |
| 2012/0123035 A1 | * | 5/2012 | Sarrazin | B22C 1/2246 524/192 |
| 2013/0225718 A1 | | 8/2013 | Ladegourdie et al. | |
| 2013/0292083 A1 | * | 11/2013 | Ladegourdie | C08G 18/0847 164/349 |
| 2015/0217365 A1 | * | 8/2015 | Sarrazin | B22C 1/2246 420/13 |
| 2018/0126449 A1 | * | 5/2018 | Vargas | C08G 18/7664 |

\* cited by examiner

PHENOLIC RESIN COMPOSITION FOR USE IN THE POLYURETHANE COLD-BOX AND/OR NO-BAKE PROCESS AND CORRESPONDING TWO-COMPONENT BINDER SYSTEMS, USES, AND PROCESSES

CROSS-REFERENCE TO RELATED APPLICATIONS

This application is a § 371 national stage entry of International Application No. PCT/EP2016/056120, filed on Mar. 21, 2016, which claims priority to European Patent Application No. 15305547.0, filed on Apr. 14, 2015, the entire contents of which are incorporated herein by reference.

The present invention relates to a phenolic resin composition for use in the polyurethane cold-box and/or no-bake process, to a two-component binder system for use in the polyurethane cold-box and/or no-bake process, to a use of a C—H-acidic compound as a formaldehyde scavenger for producing a phenolic resin composition for use in the polyurethane cold-box and/or no-bake process, to a process for producing a phenolic resin composition, to a process for producing a two-component binder system and to a process for producing a feeder, a foundry mold or a foundry core from a molding material mixture and finally to corresponding feeders, foundry molds and foundry cores.

The invention is defined in the claims, and specific aspects of the invention are defined and described below.

In the production of feeders, foundry molds and foundry cores, binder systems based on polyurethane are used extensively, in particular for mold and core production by the polyurethane cold-box and/or no-bake process.

Binder systems for the polyurethane cold box and/or no-bake process typically comprise two binder components, namely:
(1) a phenolic resin composition as a polyol component (=phenolic resin component) and
(2) a polyisocyanate component comprising a polyisocyanate having at least two isocyanate groups per molecule.

These components are optionally solvent-containing and are often packaged and marketed in separate containers.

The phenolic resin composition used as the polyol component (=phenolic resin component) preferably comprises an ortho-condensed phenolic resol, i.e. a phenolic resin of the benzyl ether resin type. This is a condensation product of
(i) one or more phenol(s) of general formula I

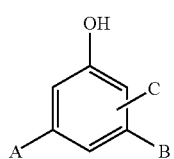

Formula I in which A, B and C independently of one another represent hydrogen, unsaturated or saturated aliphatic groups having not more than 16 carbon atoms, wherein the aliphatic groups are preferably alkyl groups preferably selected from the group consisting of methyl, ethyl, n-propyl, i-propyl, n-butyl, i-butyl, tert-butyl, octyl and nonyl, or are olefinic groups,
(ii) with one or more aldehydes of the general formula R'CHO in which R' is a hydrogen atom or an alkyl group having 1-8 carbon atoms.

Examples of suitable phenols which fall under formula I are phenol ($C_6H_5OH$), o-cresol, m-cresol, p-cresol, p-butylphenol, p-octylphenol, p-nonylphenol and cardanol (description for compounds of formula I, wherein B is an aliphatic, unbranched group having 15 carbon atoms and 0, 1, 2 or 3 double bonds); of these, phenol ($C_6H_5OH$), o-cresol and cardanol are preferred, phenol ($C_6H_5OH$) is particularly preferred.

Preferred as the aldehyde is formaldehyde, which can also be used in the form of paraformaldehyde. It is particularly preferable in practice when (i) formaldehyde is used as the sole aldehyde or (ii) formaldehyde is used in combination with one or more further aldehydes.

The above indications concerning preferred phenols and aldehydes and resulting preferred ortho-condensed phenolic resols (i.e. phenolic resins of the benzyl ether resin type) also apply to the phenolic resin compositions according to the invention which are described in detail below. The present invention relates to ortho-condensed phenolic resols, the production of which employs formaldehyde.

The reaction of (i) phenols of the specified general formula I with (ii) aldehydes (in particular formaldehyde) is preferably effected in the liquid phase, typically at a temperature below 130° C. Catalytic amounts of ortho-directing, divalent metal ions such as $Zn^{2+}$ are added to the reaction mixture.

Preferred ortho-condensed phenolic resols, i.e. benzyl ether resins, conform to the following general formula II:

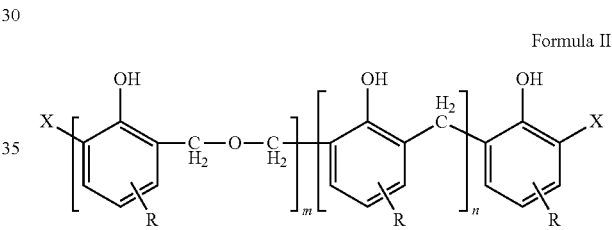

Formula II

Herein R is hydrogen or a substituent in the meta or para position relative to the phenolic hydroxy group, preferably from the group consisting of methyl, n-butyl, i-butyl, tert-butyl, octyl, nonyl and (as results from use of cardanol) pentadecenyl, pentadecadienyl and pentadecatrienyl; the sum of m and n is at least 2 and the ratio m/n is at least 1. X is hydrogen, $CH_2OH$ (methylol group, results from the reaction of formaldehyde) or an etherified methylol group (results from the reaction of formaldehyde in the presence of an alcohol).

Preferred embodiments of compounds of formula II are obtained by selecting preferred phenols of formula I and when using formaldehyde, optionally in the presence of alcohol, in particular when selecting phenol ($C_6H_5OH$). This selection in combination with the use of formaldehyde is particularly preferred in the context of the present invention. When formaldehyde is used, i.e. when producing a phenol-formaldehyde resin, relatively large amounts of formaldehyde remain, which have hitherto not been completely separable industrially, in the product mixture.

Numerous descriptions of the production of such resins may be found in the patent literature. Examples which may be mentioned are U.S. Pat. No. 3,485,797, EP 1,057,554 and EP 771,599.

In a phenolic resin composition, ortho-condensed phenolic resols, i.e. benzyl ether resins, are typically employed in conjunction with other constituents, for example in combination with an organic solvent, i.e. in the form of a solution.

The solvent is frequently used to suitably adjust the viscosity of the resulting phenolic resin composition for mixing with a molding material. As other constituents of a phenolic resin composition comprising an ortho-condensed phenolic resol in some cases other resins, for example novolacs, are also used. The above indications concerning other constituents also apply to the present invention, which is described in detail below.

The polyisocyanate component of a two-component binder system for use in the polyurethane cold-box and/or no-bake process typically comprises an aromatic polyisocyanate having preferably two to five isocyanate groups; it is also possible to use mixtures of such polyisocyanates. Particular preference is given to diphenylmethane diisocyanate (MDI), triphenylmethane triisocyanate, polymethylene polyphenyl isocyanates (polymeric MDI) and mixtures thereof.

The polyisocyanate is often used in concentrations sufficient to bring about the curing of the phenolic resin(s). Preference is given to using 10-500% by weight, preferably 20-300% by weight, of polyisocyanate based on the employed mass of ortho-condensed phenolic resol (as a constituent of the phenolic resin composition). The polyisocyanate is preferably used in liquid form; liquid polyisocyanates can be used in undiluted form, solid or high-viscosity liquid polyisocyanates are typically used in the form of a solution in an organic solvent, wherein the solvent can amount to up to 80% by weight of the polyisocyanate component.

The above indications concerning the polyisocyanate component and the use thereof also apply to the two-component binder systems according to the invention which are described in more detail below.

In practice it is customary to use mixtures of solvents tuned to the particular binder system (phenolic resin and polyisocyanate).

As nonpolar, aromatics-containing solvents, the phenol resin component and the polyisocyanate component preferably employ mixtures of high-boiling aromatic hydrocarbons, i.e. mixtures of aromatic hydrocarbons having a boiling range above about 150° C. at standard pressure (e.g. solvent naphtha, CAS number 64742-94-5).

EP1057554 teaches the preferred use of alkyl silicates, alkyl silicate oligomers and mixtures thereof. These solvents are in practice used in the phenolic resin component and in the polyisocyanate component.

Polar solvents employed include, inter alia, certain sufficiently high-boiling esters, for example the "symmetrical" esters described in DE-PS 27 59 262, in which both the acid radical and the alcohol radical have a relatively large number of carbon atoms in the same range (about 6 to 13 carbon atoms).

Fatty acid alkyl esters, for example the methylmonoesters of one or more fatty acids having a carbon chain from 12 carbon atoms described in EP 0 771 559 are suitable solvents or solvent components, for example rapeseed oil methyl ester.

The above indications concerning the solvents also apply to the phenolic resin composition according to the invention and the two-component binder system according to the invention which are described in detail below.

For all the advantages of polyurethane-based binder systems for foundry technology (especially those comprising an above-described phenolic resin component and/or an above-described polyisocyanate component) it is always considered a disadvantage that processing of phenol-formaldehyde resins results in formaldehyde emissions. These emissions during processing, but also evaporations and outgassings after feeder, core or mold production in the polyurethane cold-box and/or no-bake process, represent a considerable workplace exposure which usually cannot be sufficiently countered by protective measures such as extractor hoods or the like.

This is particularly important since products (e.g. phenolic resin compositions) having a proportion of greater than 0.1% by weight of free formaldehyde are classified as harmful to health. Particularly ortho-condensed phenolic resols, i.e. benzyl ether resins, the production of which employs formaldehyde, are considered problematic in this respect.

Specific phenolic resin compositions are already known which comprise so-called formaldehyde scavengers and/or other reactant partners for formaldehyde to reduce the proportion of free formaldehyde in a phenol-formaldehyde resin.

Thus, urea is used with particular fondness in phenolic resin chemistry (see J. of Trop. forest, Vol. 24, issue 3, p. 348: Addition of urea as formaldehyde scavenger). However, urea has the disadvantage that it does not dissolve in conventional cold-box solvents and also shortens the processing time (benchlife) of the finished sand mixture.

U.S. Pat. No. 5,358,748 relates to "Aqueous mixture of water-soluble phenol-formaldehyde resin, formaldehyde scavenger, strong acid, and having almost no alkyl amine, high-speed, odorless curing" (title). Guanidine, melamine or triazine are disclosed there inter alia as formaldehyde scavengers in aqueous resols. These formaldehyde scavengers are not suitable for use in the cold-box process (and thus not suitable for use in corresponding phenolic resin compositions) for the same reasons as urea.

U.S. Pat. No. 4,273,179 relates to "Phenolic resin-polyisocyanate binder systems containing dibasic ester solvents" (title). The use of "dibasic ester" having 1 to 4 carbon atoms in polyurethane-based binder systems is likewise disclosed. Also disclosed is a "resin composition" comprising a benzyl ether resin, aromatic solvents, furfuryl alcohol and, as a further solvent, diethyl malonate. Neither a reaction of the solvent constituents nor the proportion of free formaldehyde is disclosed. The benzyl ether resin ("commercial benzylic ether resin") is not further specified, so that conclusions cannot be drawn about the proportion of formaldehyde contained therein.

FR 2 948 307 relates to "Method for producing a body made from a granular mixture" (title). Carbohydrazides are disclosed as formaldehyde scavengers in polycondensed resins.

Another approach for reducing the proportion of free formaldehyde is the oxidation thereof to formic acid (HCOOH) by means of oxidizing agents such as peroxodisulfate (cf. FR 1056171 A) or peroxides (cf. JP 49 25108 or GB 1121649) for example. However, this has the disadvantage that the formic acid formed from the formaldehyde by oxidation has an unpleasant odor and is highly corrosive. Moreover, employment in the cold-box process is not preferred, since the oxidizing agents used can in the presence of $Zn^{2+}$ ions lead to a precipitation of ZnO and consequently to a clouding of the product.

It was a primary object of the present invention to provide a phenolic resin composition comprising an ortho-condensed phenolic resol having etherified and/or free methylol groups for use in the polyurethane cold-box and/or no-bake process which (as described above) is produced/producible by reaction of formaldehyde but nevertheless contains free formaldehyde in an amount of less than 0.1% by weight, preferably less than 0.08% by weight, particularly preferably less than 0.05% by weight and thus is no longer particularly harmful to health.

It was a further object of the present invention to specify a corresponding two-component binder system for use in the polyurethane cold-box and/or no-bake process, which comprises the phenolic resin composition to be specified according to the primary objective.

According to a specific aspect it was a further object of the present invention to specify a formaldehyde scavenger for producing a phenolic resin composition for use in the polyurethane cold-box and/or no-bake process which/whose reaction products with formaldehyde in said methods and in the resulting feeders, molds or cores is/are considered disruptive only to an acceptable degree, if at all.

It was also an object of the present invention to specify a process for producing a phenolic resin composition to be specified according to the primary object.

It was also an object of the present invention to specify a process for producing a two-component binder system to be specified according to the further object.

It was also an object of the present invention to specify a process for producing a feeder, a foundry mold or a foundry core from a molding material mixture, wherein the molding material mixture is bound by means of a two-component binder system to be specified according to the further object.

Finally, it was an object of the present invention to specify corresponding feeders, foundry molds and foundry cores producible according to the process to be specified.

The primary object of the present invention is achieved by a phenolic resin composition for use in the polyurethane cold-box and/or no-bake process, comprising the following sub-stances:
  an ortho-condensed phenolic resol having etherified and/or free methylol groups in a total amount of 40 to 60% by weight based on the total mass of the phenolic resin composition,
  free formaldehyde in an amount of less than 0.1% by weight, preferably less than 0.08% by weight, particularly preferably less than 0.05% by weight, in each case based on the total mass of the phenolic resin composition,
  one or more reaction products of formaldehyde with one or more C—H-acidic reactant compounds,
  other constituents in a total amount of at least 38% by weight,
wherein the amount of water in the phenolic resin composition is not more than 1.0% by weight (preferably not more than 0.5% by weight), in each case based on the total mass of the phenolic resin composition.

The term "ortho-condensed phenolic resol having etherified and/or free methylol groups" refers to a phenolic resin whose molecules comprise
  (a1) (a1-i) ortho position methylene ether bridge-linked
    (a1-ii) aromatic rings resulting from phenolic monomers
  and
  (b1) (b1-i) ortho position-arranged
    (b1-ii) etherified and/or free methylol groups
(cf. also formula II).

The term "phenolic monomers" encompasses both (and in particular) unsubstituted phenol ($C_6H_5OH$) and substituted phenols, for example o-cresol, m-cresol, p-cresol, p-butylphenol, p-octylphenol, p-nonylphenol and cardanol (description for compounds of formula I, wherein B is an aliphatic, unbranched group having 15 carbon atoms and 0, 1, 2 or 3 double bonds, in particular pentadecenyl, pentadecadienyl and pentadecatrienyl); of these "phenolic monomers" phenol ($C_6H_5OH$), o-cresol and cardanol are preferred, phenol ($C_6H_5OH$) is particularly preferred. The term "ortho position" refers to the ortho position with respect to the hydroxyl group of the phenol. This does not exclude the molecules of the ortho-condensed phenolic resol to be used according to the invention also comprising
    (a2) methylene-linked aromatic rings (in addition to methylene ether bridge-linked aromatic rings (a1))
  and/or
    (b2) terminal hydrogen atoms in the ortho position (in addition to terminal methylol groups in the ortho position (b1).

The term "etherified and/or free methylol groups" refers to substituents of the aromatic rings having the general formula —$CH_2OR$ (where R=a hydrogen atom or an organic radical). These substituents of the aromatic rings are preferably linked in the ortho position. "Free" methylol groups are substituents in which R is a hydrogen atom and "etherified" methylol groups are substituents in which R is an organic radical.

In the molecules of the ortho-condensed phenolic resols to be used in accordance with the invention the ratio of methylene ether bridges to methylene bridges is preferably at least 0.5, particularly preferably at least 1, and the ratio of terminal methylol groups in the ortho position to terminal hydrogen atoms in the ortho position is preferably at least 0.5, particularly preferably at least 1, very particularly preferably at least 1.5, yet more preferably at least 2.

As indicated above, such phenolic resins are also referred to as benzyl ether resins. They are obtainable by polycondensation of phenols and formaldehyde (optionally in the form of paraformaldehyde) in a molar ratio of 1:1 to 1:2, preferably 1:1.2 to 1:1.5, catalyzed by divalent metal ions (preferably $Zn^{2+}$) in a weakly acid medium.

The methylol groups of the phenolic resin result from the reaction with formaldehyde; etherified methylol groups results from the reaction with formaldehyde in the presence of an etherification-inducing alcohol.

Particularly in the industrial production of relevant ortho-condensed phenolic resols having a high proportion of free and/or etherified methylol groups for use in the cold-box or no-bake process, proportions of free formaldehyde remain in the product mixture which results after the polycondensation of phenols and formaldehyde as described above.

In line with the usual understanding of those skilled in the art, the term "ortho-condensed phenolic resol" encompasses compounds such as are disclosed in the textbook "Phenolic Resins: A Century of progress" (Editor: L. Pilato, Publisher: Springer, year of publication: 2010) in particular on page 477 by figure 18.22. The term likewise encompasses the "benzyl ether resins (ortho-phenol resols)" indicated at 3.1.1 in the VDG leaflet R 305 "urethane cold-box process" (February 1998). The term also encompasses the "phenolic resins of the benzyl ether resin type" disclosed in EP 1 057 554 B1, cf. there in particular paragraphs [0004] to [0006].

The ortho-condensed phenolic resol of the phenolic resin component to be used according to the invention comprises free methylol groups —$CH_2OH$ and/or etherified methylol groups —$CH_2OR$. In an etherified methylol group, the hydrogen atom which in the free methylol group —$CH_2OH$ is bonded to the oxygen atom is replaced by a radical R; etherified methylol groups are formed in the presence of alcohol during the reaction of the formaldehyde with the phenol employed. In a first preferred alternative, R is an alkyl radical, i.e. the groups —$CH_2OR$ are alkoxymethylene groups. Preference is given here to alkyl radicals having one to ten carbon atoms, preferably from the group consisting of methyl, ethyl, n-propyl, i-propyl, n-butyl, i-butyl, tert-butyl, octyl, and nonyl.

The term "free formaldehyde" here refers to the formaldehyde present in a resin in molecular form, which is determined by a KCN method (see below method 2 in the examples).

The term "C—H-acidic reactant compound" refers to organic compounds which are capable of donating hydrogen atoms attached to a carbon atom as protons to formally act as an acid.

Especial preference is given to C—H-acidic reactant compounds which mix well with phenolic resin compositions according to the invention.

It is preferable to use C—H-acidic compounds
which have a flame point greater than 60° C.
and/or
which have a boiling point in the range of cold-box-typical solvents preferably of above 150° C.
In addition the C—H-acidic compounds shall preferably
not be a CMR substance of category 1A or 1B,
not have an unpleasant inherent odor,
not increase the viscosity of the finished resin.

The invention is based on the surprising discovery that the proportion of free formaldehyde in phenolic resin compositions comprising ortho-condensed phenolic resol having etherified and/or free methylol groups can be reduced to less than 0.1% by weight by reaction with one or more C—H-acidic compounds. This forms one or more reaction products of the formaldehyde with the one or more C—H-acidic reactant compounds. This was particularly surprising since, according to well-known teaching (see Bayer/Walter, Lehrbuch der organischen Chemie, 20th ed., 1984, p. 307f) this type of reaction does not occur without the addition of a base. Often used bases for performing such reactions are piperidine, diethylamine or $K_2CO_3$ (see: H. Gault and A. Roesch, mémoires présentés soc. chim., 1987, 148, 1410). Such bases are not added during production of a phenolic resin composition according to the invention and the basic properties of the reaction mixture are thus not intensified for the purpose of the reaction. In addition, the reaction products formed during the reaction have surprisingly proved non-disruptive upon use of the resulting phenolic resin composition in the polyurethane cold-box and/or no-bake process. By contrast the formed reaction products of the formaldehyde with the one or more C—H-acidic reactant compounds bring about improved decomposition properties of cured corresponding binder systems; in this regard reference is made to the detailed indications given in connection with the two-component binder system according to the invention.

There are various pointers in the literature for the use of C—H-acidic compounds as formaldehyde scavengers:

US 2011/0015341 A1 relates to "phenol-formaldehyde resins, method for the production thereof and use thereof as binders" (title). The use of acetylacetone, methyl acetoacetate or 4-oxopentanal in aqueous solution in combination with an inorganic salt (in particular a borate) in the production of phenol-formaldehyde resins is disclosed. Melamine and urea are mentioned as "formaldehyde collectors".

EP 0138 448 B1 relates to a "method for producing a self-contained pressure-sensitive copying material involving the removal of free formaldehyde from a formaldehyde-containing suspension of microcapsules" (title). Malonic acid, acetylacetone, malonamide, diethyl malonate, ethyl acetoacetate, cyclohexanone, cyclopentanone, and cyclic ketones and beta-dicarbonyl compounds generally are disclosed as formaldehyde scavengers.

U.S. Pat. No. 5,160,503 relates to "water-soluble blends of active methylene compounds and polyhydric alcohols as formaldehyde scavengers" (title). The use of dialkyl malonate in combination with acetylacetone as a formaldehyde scavenger in aqueous solutions is disclosed.

U.S. Pat. No. 2,212,506 relates to "Preparation of methylene dialkyl malonates" (title) and discloses the production of methylenedialkylmalonates by reaction of dialkylmalonate with formaldehyde in an alkaline medium and almost anhydrous solvents (<5% water).

U.S. Pat. No. 5,795,933 relates to "Containing formaldehyde resin, formaldehyde scavenger and carrier" (title) and discloses the use of formaldehyde scavengers with at least one active methylene group hydrogen such as for example 1,3-cyclohexanedione, dimethylmalonate or diethyl malonate in aqueous reaction medium and at an alkaline pH of about 7.2 to 9.0.

Particular preference is given to a phenolic resin composition according to the invention (as defined above), wherein the total amount of reaction products of formaldehyde with one or more C—H-acidic reactant compounds is greater than 0.1% by weight.

Such a phenolic resin composition is based on a base mixture which, in addition to an ortho-condensed phenolic resol with etherified and/or free methylol groups, contains a considerable amount of free formaldehyde. Reference is made to the indications given below concerning the inventive process for producing a (preferably inventive) phenolic resin composition.

Particular preference is given to a phenolic resin composition according to the invention (as defined above, preferably as defined as preferred above), wherein the other constituents comprise:
one or more C—H-acidic compounds, wherein the pKa of the C—H-acidic compounds is preferably in the range from 5 to 14 (preferably greater than 7, preferably greater than 8), based on the acidic, carbon-bonded hydrogen.
and/or
a solvent selected from the group consisting of fatty acid alkyl esters, alkyl silicates, alkyl silicate oligomers and mixtures thereof.

A phenolic resin composition, comprising (in addition to other constituents) solvents, is preferably adjusted to a viscosity preferred for practical purposes so that the phenolic resin composition may be better processed than the corresponding composition without solvent and with a correspondingly different viscosity.

C—H-acidic compounds having a pKa above 14 are generally unsuitable for reaction with formaldehyde. While their presence in a phenolic resin composition according to the invention is not excluded, it is also not preferred.

Preference is given to a phenolic resin composition according to the invention (as defined above, preferably as defined as preferred above), wherein the or at least one of the C—H-acidic compounds is identical to the C—H-acidic reactant compound of the or of one of the reaction products.

It is preferable when each of the C—H-acidic compounds present in the phenolic resin composition corresponds to a reaction product of formaldehyde likewise present in the phenolic resin composition; in such embodiments each C—H-acidic compound employed contributes to reducing the formaldehyde content of the phenolic resin composition.

Preference is given to a phenolic resin composition (as defined above, preferably as defined as preferred above), the or at least one of the C—H-acidic reactant compounds is a carbonyl compound capable of enolate formation, preferably a beta-dicarbonyl compound.

It will be appreciated that such a carbonyl compound capable of enolate formation, preferably a beta-dicarbonyl compound, is a preferred other constituent of the phenolic resin composition according to the invention.

Very particular preference is given to a phenolic resin composition according to the invention (as defined above, preferably as defined as preferred above), wherein the or at least one of the C—H-acidic reactant compounds is selected from the group consisting of dialkylmalonate, preferably diethyl malonate and dimethylmalonate.

These compounds are in each case a preferred other constituent of the phenolic resin composition according to the invention.

Diethyl malonate and dimethyl malonate contain no nitrogen atoms which can function as Lewis bases; it is believed that this makes them particularly suitable for phenolic resin compositions intended for use in the polyurethane cold-box and/or no-bake process. Comparative compounds whose nitrogen atoms can function as Lewis bases are, for example, urea, guanidine, melamine or triazine. These compounds have proven unsuitable for the cold-box process in the applicants' own tests since they shorten the sand life of the finished sand mixture (see above).

The reaction products when using a malonic acid ester as a C—H-acidic reactant compound include in particular 2-methylene malonic esters, 2,2-bis(hydroxymethyl) malonic esters, 2-(hydroxymethyl) malonic esters and 2-(3-hydroxy-2-oxapropyl) malonic esters.

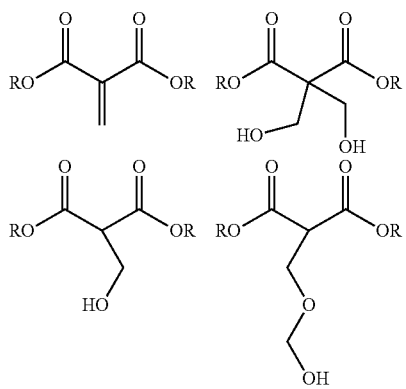

wherein each R is independently at each occurrence methyl, ethyl, n-propyl, i-propyl, n-butyl, i-butyl, tert-butyl or another alkyl having 4 to 9 carbon atoms.

Further nonlimiting examples of a reaction product of formaldehyde with a C—H-acidic reactant compounds may also include:

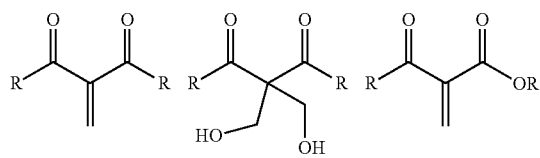

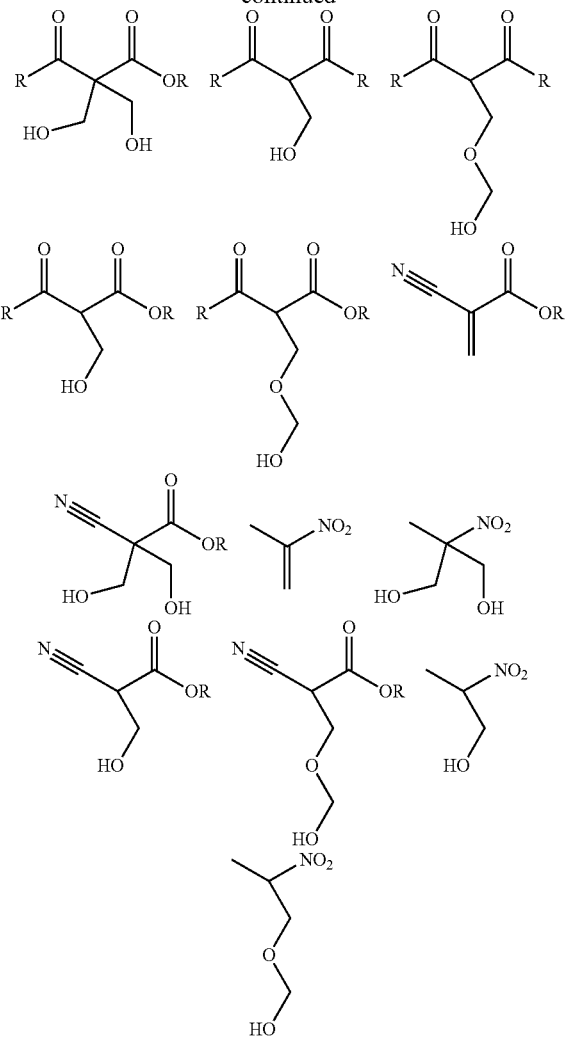

wherein R is independently at each occurrence methyl, ethyl, n-propyl, i-propyl, n-butyl, i-butyl, tert-butyl or another alkyl having 4 to 9 carbon atoms.

The reaction products may be detected by known analytical methods, for example GC-MS, $^1$H NMR or $^{13}$C NMR.

A phenolic resin composition according to the invention (as defined above, preferably as defined as preferred above) preferably comprises an ortho-condensed phenolic resol having etherified and/or free methylol groups in a total amount of from 40 to 60% by weight, free formaldehyde in an amount of less than 0.1% by weight, preferably less than 0.08% by weight, particularly preferably less than 0.05% by weight, in each case based on the total mass of the phenolic resin composition, one or more reaction products of formaldehyde with one or more C—H-acidic reactant compounds, other constituents in a total amount of at least 38% by weight, wherein the other constituents comprise a solvent selected from the group consisting of fatty acid alkyl esters, alkyl silicates, alkyl silicate oligomers and mixtures thereof.

Phenolic resin compositions according to the invention which comprise solvents selected from the group consisting of fatty acid alkyl esters (preferably methyl esters, preferably methyl esters of rapeseed oil), alkyl silicates, alkyl silicate oligomers and mixtures thereof have particularly preferred properties (for example an adjustable viscosity) for processability in industrial processes. Such phenolic resin compositions according to the invention preferably comprise a larger mass fraction of said solvent(s) than of aromatic solvents.

It is preferable when a phenolic resin composition according to the invention (as described above, preferably as described as preferred above) comprises only small amounts of polar solvents or no polar solvents; it is especially preferable when the total amount of furfuryl alcohol and furfural is less than 5% by weight, preferably less than 3% by weight, based on the total amount of the phenolic resin composition according to the invention. It is particularly preferable when a phenolic resin composition according to the invention comprises neither furfuryl alcohol nor furfural.

In addition it is preferable when a phenolic resin composition according to the invention (as described above, preferably as described as preferred above) comprises only small amounts of aromatic solvents or no aromatic solvents; it is especially preferable when the total amount of aromatic solvents is less than 25% by weight, preferably less than 20% by weight, based on the total amount of the phenolic resin composition according to the invention.

A phenolic resin composition according to the invention preferably comprises not more than a total amount of 0.25% by weight of borate (and preferably comprises no borate), preferably no inorganic salts in a total amount of more than 0.25% by weight, in each case based on the total amount of the phenolic resin composition. A phenolic resin composition according to the invention preferably comprises not more than a total amount of 0.0025% by weight of borax (and preferably comprises no borax).

In the phenolic resin compositions of the present invention (as defined above, preferably as described as preferred above), the ortho-condensed phenolic resol preferably has a ratio of the total amount of etherified and/or free methylol groups to aromatic rings in the range from 0.2:1 to 2:1, preferably in the range from 0.3:1 to 1.2:1, particularly preferably in the range from 0.3:1 to 0.7:1. The present invention is especially relevant when thus-constituted ortho-condensed phenolic resols are to be used; this is because the production thereof is carried out with a particularly large excess of formaldehyde and correspondingly high residual amounts of formaldehyde therefore remain in the product mixture, which can be eliminated in accordance with the invention without impairing the suitability of the mixture for use in the cold-box or no-bake process. In the production of thus-constituted ortho-condensed phenolic resols the molar ratio of the total amounts of phenolic monomers to formaldehyde is preferably in the range from 1:1.3 to 1:2. The industrial production and use of such ortho-condensed phenolic resols has hitherto been impeded because said resols had an unpleasant odor and were even harmful to health due to the high content of free formaldehyde.

The present invention also relates to a two-component binder system for use in the polyurethane cold-box and/or no-bake process, consisting of
- a phenolic resin composition as defined above, preferably as defined as preferred above, as a phenolic resin component
and
- a polyisocyanate component comprising a polyisocyanate having at least two isocyanate groups per molecule.

Two-component binder systems according to the invention are particularly poor in formaldehyde; the advantages of the phenolic resin composition according to the invention discussed above and the advantages of the processes and uses according to the invention discussed below apply correspondingly.

The invention also relates to the use of a C—H-acidic compound as a formaldehyde scavenger for producing a phenolic resin composition, in particular a phenolic resin composition according to the invention, for use in the polyurethane cold-box and/or no-bake process. With regard to preferred C—H-acidic compounds, the above indications from the discussion of phenolic resin compositions according to the invention apply correspondingly.

Preference is given to the use according to the invention (as defined above) of a C—H-acidic compound for producing a (preferably inventive) phenolic resin composition for use in the polyurethane cold-box and/or no-bake process, wherein the C—H-acidic compound is used as
  (i) a formaldehyde scavenger
and simultaneously as
  (ii) a means for accelerating the decomposition of the polyurethane cold-box or no-bake resin.

The invention also relates to a process for producing a (preferably inventive) phenolic resin composition comprising the steps of:
  producing or providing a base mixture comprising
    an ortho-condensed phenolic resol having etherified and/or free methylol groups
    and
    free formaldehyde in an amount of more than 0.25% by weight, preferably of more than 0.35% by weight, particularly preferably of more than 0.45% by weight, based on the total weight of the base mixture,
    wherein the base mixture contains not more than 2% by weight of water, preferably not more than 1% by weight,
  mixing the base mixture with one or more C—H-acidic compounds to afford a reaction mixture and reacting the free formaldehyde with the one or more C—H-acidic compounds to afford one or more reaction products, wherein the C—H-acidic compounds are altogether present in a molar excess based on the total amount of free formaldehyde in the mixture,
    wherein the reaction mixture contains not more than 2% by weight of water, preferably not more than 1% by weight,
  and subsequently
    adding other constituents so that the phenolic resin composition results, preferably a phenolic resin composition according to the invention as described above (preferably as designated as preferred above).

The abovementioned indications concerning the phenolic resin composition according to the invention, two-component binder systems according to the invention and uses apply correspondingly to the process according to the invention. This is true in particular for preferred C—H-acidic compounds, preferred other constituents of the phenolic resin composition and preferred embodiments of the ortho-condensed phenolic resol contained therein.

When performing the process according to the invention, the person skilled in the art will take into account that to react the free formaldehyde suitable reaction parameters adapted to the circumstances of the individual case should be established; in particular the person skilled in the art will determine suitable reaction temperatures by means of simple preliminary tests taking into account the examples reported below.

It has been found that, surprisingly, by mixing the base mixture (containing the abovementioned large amount of free formaldehyde) with one or more C—H-acidic compounds to afford a reaction mixture and reacting the free formaldehyde with the one or more C—H-acidic compounds, the amount of free formaldehyde can be reduced to below 0.1% by weight (and even below 0.08% by weight and below 0.05% by weight). The above-described problems caused by a high content of formaldehyde can accordingly be avoided.

Base and reaction mixtures as defined above which contain not more than 2% by weight, preferably not more than 1% by weight, of water based on the total mass of the base or reaction mixture are provided according to the invention since water can react with a corresponding polyisocyanate component of a two-component binder system and thus impair the degree of crosslinking of the two components. Accordingly, in the process according to the invention, while other constituents are added to the reaction mixture so that the phenolic resin composition results, water is preferably included in these other constituents only in extremely small amounts, if at all. For preferred other constituents, as well as for further less preferred constituents, reference is made to the related abovementioned indications concerning phenolic resin compositions according to the invention, which apply correspondingly here.

Preference is given in particular to a process according to the invention (as defined above), wherein the production of the base mixture comprises the following step:

reacting one or more phenolic monomers with formaldehyde, wherein the molar ratio of the total amounts of formaldehyde to phenol monomers is in the range from 1.3:1 to 2:1.

Base mixtures produced in this manner comprise a particularly large amount of free formaldehyde. The reduction in the amount of free formaldehyde is therefore particularly important. This is achieved by mixing the corresponding base mixture with one or more C—H-acidic compounds to afford a reaction mixture and reacting the free formaldehyde with the one or more C—H-acidic compounds to form one or more reaction products, wherein the C—H-acidic compound as a whole are altogether present in a molar excess based on the total amount of free formaldehyde in the mixture.

Particular preference is given to a process according to the invention (as defined above, preferably as defined as preferred above), wherein the pKa of the one or more C—H-acidic compounds is in the range from 5 to 14, based on the acidic carbon-bonded hydrogen. The above indications concerning preferred pKa values of the C—H-acidic compounds apply correspondingly here.

Especial preference is given to a process according to the invention (as defined above, preferably as defined as preferred above), wherein the reaction of the free formaldehyde with the one or more C—H-acidic compounds to form one or more reaction products is effected at a temperature in the range from 80 to 126° C., preferably at a temperature in the range from 80 to 100° C.

At temperatures above 126° C. irreversible damage is often caused to the strived-for ortho-condensed phenolic resol; in individual cases damage occurs even at temperatures of greater than 100° C. At temperatures below 80° C. the reaction of the free formaldehyde with the one or more C—H-acidic compound(s) often takes too long for practical purposes. This applies in particular when the preferred C—H-acidic compounds are used.

Preference is given to a process according to the invention (as defined above, preferably as defined as preferred above), wherein the molar ratio of the total amount of C—H-acidic compounds to the total amount of formaldehyde in the reaction mixture is greater than 2:1, preferably greater than 3:1.

Such processes according to the invention, in which a considerable excess of C—H-acidic compounds relative to the total amount of formaldehyde is used in the reaction mixture, result in a particularly effective reduction in the content of free formaldehyde.

Particular preference is given to a process according to the invention (as defined above, preferably as defined as preferred above), wherein the reaction of the free formaldehyde with the one or more C—H-acidic compounds to form one or more reaction products is performed at least until 50 mol % of the free formaldehyde present in the base mixture have reacted, preferably until 70 mol % of the free formaldehyde present in the base mixture have reacted, and/or in the reaction mixture the proportion of free formaldehyde is less than 0.2% by weight based on the total mass of the reaction mixture.

Reaction mixtures having a proportion of free formaldehyde smaller than 0.2% by weight based on the total mass of the reaction mixture may already be converted into a (preferably inventive) phenolic resin composition having a proportion of free formaldehyde of less than 0.1% by weight based on the total mass of the phenolic resin composition by addition of an equal mass of other constituents.

The invention also relates to a process for producing a (preferably inventive) two-component binder system comprising the steps of:

providing or producing a phenolic resin composition as described above (preferably a phenolic resin composition according to the invention or produced by a process according to the invention)

and combining the provided or produced phenolic resin component with a polyisocyanate component comprising a polyisocyanate having at least two isocyanate groups per molecule, so that the (preferably inventive) two-component binder system results.

The invention also relates to a process for the production of a feeder, a foundry mold or a foundry core from a molding material mixture, wherein the molding material mixture is bound by means of a two-component binder system according to the invention (as described above, preferably as described as preferred above), preferably in the cold-box or in the no-bake process using the catalysts and apparatuses customary for this purpose.

The invention also relates to feeders, foundry molds and foundry cores which can be produced by such a method according to the invention (as described above, preferably as described as preferred above). Such feeders, foundry molds and foundry cores are produced using a phenolic resin composition according to the invention (as described above, preferably as described as preferred above) as a constituent of a two-component binder system according to the invention (as described above, preferably as described as preferred above).

The invention is more particularly elucidated hereinbelow by reference to inventive examples and noninventive comparative examples:

Designations:

DBE=DBE-2 (commercial product from Rhodia)

Solvesso=Solvesso 100 (commercial product from Exxon comprising various aromatic hydrocarbons)

RME=rapeseed oil methyl ester (biodiesel; "Vegetable oil based methyl ester" commercial product from Cargill)
Silan 187=Silquest A-187 (commercial product of Crompton SA, gamma-glycidoxypropyltrimethoxysilane)
Hydrofluoric acid 40%=hydrofluoric acid (40-45% by weight of HF in aqueous solution, commercial product from Honeywell)
MDI=Lupranat® M 20 S (commercial product from BASF comprising polymeric MDI and proportions of monomeric MDI)

COMPARATIVE EXAMPLE 1—NONINVENTIVE: PRODUCTION OF A PHENOLIC RESIN COMPOSITION WITHOUT USE OF A C—H-ACIDIC COMPOUND

Step 1:
A premix was produced by mixing 45.96 kg of phenol, 38.14 kg of an aqueous formaldehyde solution (50% by weight of formaldehyde based on the total mass of the aqueous formaldehyde solution) and 0.07 kg of zinc acetate dihydrate in a reaction vessel. The pH was 5, measured at 20° C.

Step 2:
The produced premix was heated to reflux temperature and held at reflux. Meanwhile, samples were taken continuously and the refractive indices of the respective sampled mixtures were determined at 20° C. until a refractive index of 1.490 was attained. The product was a premix having a refractive index of 1.490.

This premix having a refractive index of 1.490 was distilled at atmospheric pressure until a temperature of 125° C. was attained (in the residue). The product was a premix distilled at atmospheric pressure.

The distillation was then continued under vacuum. To this end the distillation conditions were chosen such that a vacuum in the reaction vessel of 60 mbar was attained. The vacuum distillation was performed at a temperature not exceeding 126° C. (measured in the residue) and not falling below 100° C. (measured in the residue).

During the distillation under vacuum, samples were taken continuously and the refractive indices of the respective sampled mixtures were determined at 20° C. until a refractive index of 1.610 was attained.

After attaining a refractive index of 1.610, the distillation was terminated; the product was a vacuum-treated premix having a refractive index of 1.610.

Step 3:
The vacuum-treated premix having a refractive index of 1.610 was cooled to at least 40° C. The resulting product is referred to as the base mixture and is intended for further processing.

The pH (assessed according to method 1) of the base mixture and the free formaldehyde content (measured according to method 2) of the base mixture were determined at 20° C. The pH assessed according to method 1 was 5.0 and the free formaldehyde content measured according to method 2 was 0.35% by weight based on the total mass of the base mixture.

The amount of resulting base mixture was 60.4% by weight based on the total mass of the premix produced in step 1.

The base mixture had a water content of 0.4% by weight.

Step 4:
Solvents and additives were added to the base mixture according to the table "Comparative example 1" and the product was thus finished. The result was a finished product having a composition according to the table "Comparative example 1".

TABLE

| "Comparative example 1": | |
|---|---|
| Composition "Comparative example 1": | Mass [kg] |
| Base mixture | 50.85 |
| DBE | 18.10 |
| Solvesso | 19.10 |
| RME | 11.50 |
| Silan 187 | 0.30 |
| Hydrofluoric acid 40% | 0.15 |

The finished product had a content of free formaldehyde (measured according to method 2) of 0.18% by weight based on the total mass of the finished product.

EXAMPLE 1—INVENTIVE: PRODUCTION OF A PHENOLIC RESIN COMPOSITION USING A C—H-ACIDIC COMPOUND

Steps 1 to 3: Producing a Base Mixture
Step 1:
A premix was produced by mixing 45.96 kg of phenol, 38.14 kg of an aqueous formaldehyde solution (50% by weight of formaldehyde based on the total mass of the aqueous formaldehyde solution) and 0.07 kg of zinc acetate dihydrate in a reaction vessel. The pH was 5, measured at 20° C.

Step 2:
The produced premix was heated to reflux temperature and held at reflux. Meanwhile, samples were taken continuously and the refractive indices of the respective sampled mixtures were determined at 20° C. until a refractive index of 1.490 was attained.

After attaining a refractive index of 1.490 the premix was distilled at atmospheric pressure until a temperature of 125° C. was attained (in the residue). The product was a premix distilled at atmospheric pressure.

The distillation was then continued under vacuum. To this end, the distillation conditions were chosen such that a vacuum in the reaction vessel of 60 mbar was attained. The vacuum distillation was performed at a temperature not exceeding 126° C. (in the residue) and not falling below 100° C.

During the distillation under vacuum samples were taken continuously and the refractive indices of the respective sampled mixtures were determined at 20° C. until a refractive index of 1.610 was attained.

After reaching the refractive index of 1.610, the vacuum distillation was terminated. The product was a vacuum-treated premix having a refractive index of 1.610.

Step 3:
The vacuum-treated premix having a refractive index of 1.610 was cooled to 100° C. at atmospheric pressure. The resulting product is referred to as the base mixture and is intended for further processing.

The pH (assessed according to method 1) of the base mixture and the free formaldehyde content (measured according to method 2) of the base mixture were determined at 20° C. The pH assessed according to method 1 was 5.0 and the free formaldehyde content measured according to method 2 was 0.35% by weight based on the total mass of the base mixture.

The base mixture had a water content of 0.4% by weight.

Step 4—Reacting Free Formaldehyde with a C—H-Acidic Compound to Form Reaction Products:

The base mixture was mixed with 3 kg of diethyl malonate (as an example of a C—H-acidic compound) at 100° C. to afford a reaction mixture and the reaction mixture was held at 100° C. for 10 minutes so that a reaction between the free formaldehyde from the base mixture and the diethyl malonate took place. The reaction mixture was subsequently cooled initially to 80° C. over 30 minutes and then to at least 40° C. The product was a cooled reaction mixture.

The content in the cooled reaction mixture of free formaldehyde (measured according to method 2) was determined at 20° C. The free formaldehyde content measured according to method 2 was 0.15% by weight based on the total mass of the cooled reaction mixture.

The amount of cooled reaction mixture was 61.8% by weight, based on the total mass of the premix produced in step 1.

Step 5—Adding Other Constituents to Complete a Phenolic Resin Composition According to the Invention:

Solvents and additives were correspondingly added to the cooled reaction mixture as per the table "Example 1" and the product was thus finished. The result was a finished product having a composition according to the table "Example 1".

TABLE

"Example 1":

| Composition "Example 1": | Mass [kg] |
| --- | --- |
| Reaction mixture | 53.85 |
| DBE | 15.10 |
| Solvesso | 19.10 |
| RME | 11.50 |
| Silan 187 | 0.30 |
| Hydrofluoric acid 40% | 0.15 |

The finished product has a content of free formaldehyde (measured according to method 2) of 0.08% by weight based on the total mass of the finished product and is a phenolic resin composition according to the invention.

COMPARATIVE EXAMPLE 2—NONINVENTIVE: PRODUCTION OF A PHENOLIC RESIN COMPOSITION WITHOUT USE OF A C—H-ACIDIC COMPOUND

Step 1:

A premix was produced by mixing 46.7 kg of phenol, 21.4 kg of commercially available paraformaldehyde (91% by weight of formaldehyde based on the total mass of the commercially available paraformaldehyde), 0.06 kg of zinc acetate dihydrate and 1.4 kg of methanol in a reaction vessel. The pH (assessed according to method 1) was 5, measured at 20° C.

Step 2:

The produced premix was heated to 110° C. and held at 110° C. for 45 minutes.

After the 45 minutes at 110° C. the heated premix was distilled at atmospheric pressure until a temperature of 125° C. was attained (in the residue). The product was a premix distilled at atmospheric pressure.

The distillation was then continued under vacuum. To this end the distillation conditions were chosen such that a vacuum in the reaction vessel of 60 mbar was attained. The distillation was subsequently continued at a temperature not exceeding 126° C. (in the residue).

During the distillation under vacuum samples were taken continuously and the refractive indices of the respective sampled mixtures were determined at 20° C. until a refractive index of 1.613 was attained.

After attaining a refractive index of 1.613 the distillation was terminated; the product was a vacuum-treated premix having a refractive index of 1.613.

Step 3:

The vacuum-treated premix having a refractive index of 1.613 was cooled to at least 40° C. The resulting product is referred to as the base mixture and is intended for further processing.

The pH (assessed according to method 1) of the base mixture and the free formaldehyde content (measured according to method 2) of the base mixture were determined at 20° C. The pH assessed according to method 1 was 5.1 and the free formaldehyde content measured according to method 2 was 0.4% by weight based on the total mass of the base mixture.

The base mixture had a water content of 0.4% by weight.

The amount of base mixture was 78.4% by weight, based on the total weight of the premix produced in step 1.

Step 4:

Solvents and additives were added to the base mixture according to the table "Comparative example 2" and the product was thus finished. The result was a finished product having a composition according to the table "Comparative example 2".

TABLE

"Comparative example 2":

| Composition "Comparative example 2": | Mass [kg] |
| --- | --- |
| Base mixture | 54.50 |
| DBE | 20.00 |
| RME | 20.00 |
| Solvesso | 5.10 |
| Silan 187 | 0.30 |
| Hydrofluoric acid 40% | 0.10 |

The finished product had a content of free formaldehyde (measured according to method 2) of 0.22% by weight based on the total mass of the finished product.

EXAMPLE 2—INVENTIVE: PRODUCTION OF A PHENOLIC RESIN COMPOSITION USING A C—H-ACIDIC COMPOUND

Steps 1 to 3: Producing a Base Mixture

Step 1:

A premix was produced by mixing 46.7 kg of phenol, 21.4 kg of commercially available paraformaldehyde (91% by weight of paraformaldehyde based on the total mass of the commercially available paraformaldehyde), 0.06 kg of zinc acetate dihydrate and 1.4 kg of methanol in a reaction vessel. The pH (assessed according to method 1) was 5, measured at 20° C.

Step 2:

The produced premix was heated to 110° C. and held at 110° C. for 45 minutes.

After the 45 minutes at 110° C. the heated premix was distilled at atmospheric pressure until a temperature of 125° C. was attained (in the residue). The product was a premix distilled at atmospheric pressure.

The distillation was then continued under vacuum. To this end the distillation conditions were chosen such that a vacuum in the reaction vessel of 60 mbar was attained. The distillation was subsequently continued at a temperature not exceeding 126° C. (measured in the residue).

During the distillation under vacuum samples were taken continuously and the refractive indices of the respective sampled mixtures were determined at 20° C. until a refractive index of 1.613 was attained.

After attaining a refractive index of 1.613 the distillation was terminated; the product was a vacuum-treated premix having a refractive index of 1.613.

Step 3:

The vacuum-treated premix having a refractive index of 1.613 was cooled to at least 100° C. The resulting product is referred to as the base mixture and is intended for further processing.

The pH (assessed according to method 1) of the base mixture and the free formaldehyde content (measured according to method 2) of the base mixture were determined at 20° C. The pH assessed according to method 1 was 5.1 and the free formaldehyde content measured according to method 2 was 0.4% by weight based on the total mass of the base mixture.

The base mixture had a water content of 0.4% by weight.

Step 4—Reacting Free Formaldehyde with a C—H-Acidic Compound to Form Reaction Products:

The base mixture was mixed with 3 kg of diethyl malonate (as an example of a C—H-acidic compound) at 100° C. to afford a reaction mixture and the reaction mixture was held at 100° C. for 10 minutes so that a reaction between the free formaldehyde from the base mixture and the diethyl malonate took place. The reaction mixture was subsequently cooled initially to 80° C. over 30 minutes and then to 40° C. The product was a cooled reaction mixture.

The content in the cooled reaction mixture of free formaldehyde (measured according to method 2) was determined at 20° C. The free formaldehyde content measured according to method 2 was 0.15% by weight based on the total mass of the cooled reaction mixture.

The amount of cooled reaction mixture was 79.2% by weight, based on the total mass of the produced premix.

Step 5—Adding Other Constituents to Complete a Phenolic Resin Composition According to the Invention:

Solvents and additives were added to the cooled reaction mixture as per the table "Example 2" and the product was thus finished. The result was a finished product having a composition according to the table "Example 2".

TABLE

"Example 2":

| Composition "Example 2" | Mass [kg] |
| --- | --- |
| Reaction mixture | 57.50 |
| DBE | 17.00 |
| RME | 20.00 |
| Solvesso | 5.10 |
| Silan 187 | 0.30 |
| Hydrofluoric acid 40% | 0.10 |

The finished product had a content of free formaldehyde (measured according to method 2) of 0.07% by weight based on the total mass of the finished product and is a phenolic resin composition according to the invention.

EXAMPLE 3—INVENTIVE: PRODUCTION OF A PHENOLIC RESIN COMPOSITION USING A C—H-ACIDIC COMPOUND (VARIOUS OTHER CONSTITUENTS IN EXAMPLES 3A AND 3B)

Steps 1 to 3: Producing a Base Mixture

Step 1:

A premix was produced by mixing 42.0 kg of phenol, 20.0 kg of commercially available paraformaldehyde (91% by weight of paraformaldehyde based on the total mass of the commercially available paraformaldehyde) and 0.1 kg of zinc acetate dihydrate in a reaction vessel. The pH (assessed according to method 1) was 5.0, measured at 20° C.

Step 2:

The produced premix was heated to 110° C. and held at 110° C. for 60 minutes and heated from 110° C. to 120° C. and held at 120° C. for 60 minutes. The product was a premix held at 120° C. for 60 minutes.

The premix held at 120° C. for 60 minutes was heated further at atmospheric pressure and distilled until a temperature of 125° C. was attained (in the residue). The product was a premix distilled at atmospheric pressure.

The distillation was then continued under vacuum. To this end the distillation conditions were chosen such that a vacuum in the reaction vessel of 60 mbar was attained. The distillation was subsequently continued at a temperature not exceeding 126° C. (measured in the residue).

During the distillation under vacuum samples were taken continuously and the refractive indices of the respective sampled mixtures were determined at 20° C. until a refractive index of $n_D^{20}=1.610$ was attained.

After attaining a refractive index of 1.610 the distillation was terminated; the product was a vacuum-treated premix having a refractive index of 1.610.

Step 3:

The vacuum-treated premix having a refractive index of 1.610 was cooled to 100° C. at atmospheric pressure. The resulting product is referred to as the base mixture and is intended for further processing.

The pH (assessed according to method 1) of the base mixture and the free formaldehyde content (measured according to method 2) of the base mixture were determined at 20° C. The pH assessed according to method 1 was 5.1 and the free formaldehyde content measured according to method 2 was 0.45% by weight based on the total mass of the base mixture.

The base mixture had a water content of 0.4% by weight.

Step 4—Reacting Free Formaldehyde with a C—H-Acidic Compound to Form Reaction Products:

The base mixture was mixed with 3 kg of dimethyl malonate (Example 3a)/3 kg of diethyl malonate (Example 3b) (each as an example of a C—H-acidic compound) at 100° C. to afford a reaction mixture and the reaction mixture was held at 100° C. for 10 minutes so that a reaction between the free formaldehyde from the base mixture and the dimethyl malonate (Example 3a)/diethyl malonate (Example 3b) took place. The reaction mixture was subsequently cooled initially to 80° C. over 30 minutes and then to at least 40° C. The result was a cooled reaction mixture.

The content in the cooled reaction mixture of free formaldehyde (measured according to method 2) was determined at 20° C. The free formaldehyde content measured according to method 2 was 0.07% by weight (Example 3a)/0.08% by weight (Example 3b) based on the total mass of the cooled reaction mixture.

The amount of cooled reaction mixture was in each case 86% by weight based on the total mass of the premix produced in step 1.

Step 5—Adding Other Constituents to Complete a Phenolic Resin Composition According to the Invention (Example 3a/Example 3b):

Solvents and additives were added to the cooled reaction mixture as per the tables "Example 3a"/"Example 3b" and the product was thus finished. The result was a finished product having a composition according to table "Example 3a"/"Example 3b".

TABLE

"Example 3a":

| Composition "Example 3a" | Mass [kg] |
| --- | --- |
| Reaction mixture | 54.00 |
| DBE | 15.10 |
| Solvesso | 19.10 |
| RME | 11.50 |
| Silan 187 | 0.30 |

TABLE

"Example 3b":

| Composition "Example 3b": | Mass [kg] |
| --- | --- |
| Reaction mixture | 53.85 |
| DBE | 14.10 |
| Tetraethyl orthosilicate (TEOS) | 32.05 |

The finished products according to "Example 3a" and "Example 3b" each had a content of free formaldehyde of less than 0.05% by weight determined according to method 2; a phenolic resin composition according to the invention is concerned in each case.

EXAMPLE 4: PRODUCING TWO-COMPONENT BINDER SYSTEMS ACCORDING TO THE INVENTION 4.1 Compositions "Example 1", "Example 2", "Example 3a" and "Example 3b" as described above were each combined with MDI mixtures 1 (Table 5), 2 (Table 6) and 3 (Table 7) to produce two-component binder systems according to the invention for use in the polyurethane cold-box process.

A total of twelve two-component binder systems were obtained from the combinations of the compositions according to "Example 1", "Example 2", "Example 3a" and "Example 3b" with the MDI mixtures 1 (cf. table 5), 2 (cf. table 6) and 3 (cf. table 7) defined below.

4.2 Compositions "Example 3a" and "Example 3b)" as described above were each combined with MDI Mixtures 4 (table 8) and 5 (table 9) to prepare two-component binder systems according to the invention for use in the polyurethane no-bake process.

A total of four two-component binder systems were obtained from the combinations of the compositions according to "Example 3a" and "Example 3b" with the MDI mixtures 4 (cf. table 8) and 5 (cf. table 9) defined below.

TABLE 5

| MDI Mixture 1: | Mass [kg] |
| --- | --- |
| MDI | 75.00 |
| Solvesso | 24.70 |
| $POCl_3$ | 0.30 |

TABLE 6

| MDI Mixture 2: | Mass [kg] |
| --- | --- |
| MDI | 75.00 |
| $POCl_3$ | 0.3 |
| Tetraethyl orthosilicate (TEOS) | 24.70 |

TABLE 7

| MDI Mixture 3: | Mass [kg] |
| --- | --- |
| MDI | 75.00 |
| $POCl_3$ | 0.3 |
| Solvesso | 24.70 |

TABLE 8

| MDI Mixture 4: | Mass [kg] |
| --- | --- |
| MDI | 75.00 |
| Tetraethyl orthosilicate (TEOS) | 25.00 |

TABLE 9

| MDI Mixture 5: | Mass [kg] |
| --- | --- |
| MDI | 75.00 |
| Solvesso | 25.00 |

EXAMPLE 5: PRODUCTION OF FOUNDRY CORES BY THE POLYURETHANE COLD-BOX PROCESS

Each of the altogether twelve two-component binder systems from Example 4.1 was employed in customary fashion for producing a foundry core by the polyurethane cold-box process.

The foundry cores obtained fulfilled all physical requirements.

The decomposition properties of the foundry cores were rated as particularly favorable.

EXAMPLE 6: PRODUCTION OF FOUNDRY CORES BY THE POLYURETHANE NO-BAKE PROCESS

Each of the four two-component binder systems from Example 4.2 was employed in customary fashion for producing a foundry core by the polyurethane no-bake box process.

The foundry cores obtained fulfilled all physical requirements.

The decomposition properties of the foundry cores were rated as particularly favorable.

Analytical Methods:

Method 1: Testing to Assess the pH of a Sample Mixture (e.g. Base Mixture, Reaction Mixture or Phenolic Resin Composition)

20 g of a sample mixture are admixed with 160 g of a mixture of 20 g of water and 140 g of ethanol p.a. and homogenized by stirring. The thus obtained solution is temperature-con-trolled to 20° C. and the pH is determined by means of a pH meter, for example a Schott CG 842 pH meter.

Method 2: Determination of the Free Formaldehyde Content in [%]

Solutions Required:

| | |
|---|---|
| "IPA/water": | Mixture of iso-propanol (IPA) (purity: p.A.) and dist. water (iso-propanol:$H_2O$ mixing ratio = 3:1) |
| KCN solution | Aqueous KCN solution (KCN concentration: 0.1 mol/l) |
| Phosphate buffer solution: | Production: Initially charge 348 g of $K_2HPO_4$ and 136 g of $KH_2PO_4$ into a 1 L volumetric flask, make up to 1 L with deionized water and mix until a clear solution is formed. |
| Borate buffer solution: | Production: Initially charge 76.4 g of $K_2B_4O_7 \times 2H_2O$ (purity: p.A.) into a 1 L volumetric flask, make up to 1 L with deionized water and mix until a clear solution is formed. |
| $Hg(NO_3)_2$ solution: | Aqueous $Hg(NO_3)_2$ solution ($Hg(NO_3)_2$ concentration: 0.05 mol/l) |
| Indicator solution: | Solution of diphenylcarbazone in methanol (diphenylcarbazone concentration: 1% by weight) |

Performance:

When performing the method, care must be taken to ensure that the sample weight is chosen according to the expected formaldehyde content and preferably such that about 10-20 ml of $Hg(NO_3)_2$ solution are needed for the titration. The following table gives guidelines for the sample weight to be chosen:

| Expected formaldehyde content [%] | Sample weight [g] |
|---|---|
| <0.05% | >10 g |
| 0.05-0.5% | 10-3 g |
| 0.5-1.0% | 3-2 g |

Measurement:

Determination of Blank Value:

A blank value must be determined before each measurement. To this end, 100 ml of "IPA/water" are initially charged into a 400 ml beaker. This is mixed with a magnetic stirrer and first 40 ml of borate buffer solution and then 20 ml of KCN solution are added. After two minutes, 5 ml of phosphate buffer solution and 3-5 drops of indicator solution are added so that coloration of the solution is observed.

Titration is performed with a 0.05 molar aqueous $Hg(NO_3)_2$ solution. The end point of the titration is indicated by the color change from pink/orange to violet. The color should be stable for at least 10 seconds after reaching the end point.

The consumption of 0.05 M $Hg(NO_3)_2$ solution is recorded as the "blank value".

Determination of sample weight and consumption of titration solution:

The sample is weighed using an analytical balance in a 400 ml beaker (=sample weight) and dissolved in 100 ml of "IPA/water". This is mixed with a magnetic stirrer and first 40 ml of borate buffer solution and then 20 ml of KCN solution are added. The pH of the solution should be in the region of 9.3.

The reaction time is measured from the moment of addition of the KCN solution and is 2 minutes.

At the end of the two-minute reaction time, 5 ml of phosphate buffer solution and 3-5 drops of indicator solution are added so that coloration of the solution is observed.

Titration is performed with a 0.05 molar aqueous $Hg(NO_3)_2$ solution. The end point of the titration is indicated by the color change from pink/orange to violet. The color should be stable for at least 10 seconds after reaching the end point.

The consumption of 0.05 M $Hg(NO_3)_2$ solution is recorded as the "consumption value".

Calculation:

The content of free formaldehyde in [% by weight] is calculated according to the following formula:

$$\text{Free formaldehyde [\% by weight]} = \frac{(\text{Blank value [ml]} - \text{consumption value [ml]}) \times 0.294 \text{ [g/ml]}}{\text{Sample weight [g]}}$$

The invention claimed is:

1. A phenolic resin composition for use in the polyurethane cold-box and/or no-bake process, comprising
   an ortho-condensed phenolic resol having etherified and/or free methylol groups in a total amount of 40 to 60% by weight based on the total mass of the phenolic resin composition,
   free formaldehyde in an amount of less than 0.1% by weight based on the total weight of the phenolic resin composition,
   one or more reaction products of formaldehyde with one or more C—H-acidic reactant compounds,
   other constituents in a total amount of at least 38% by weight,
   wherein the amount of water in the phenolic resin composition is not more than 1.0% by weight in each case based on the total mass of the phenolic resin composition.

2. The phenolic resin composition as claimed in claim 1, wherein the total amount of reaction products of formaldehyde with one or more C—H-acidic reactant compounds is greater than 0.1% by weight.

3. The phenolic resin composition as claimed in claim 1, wherein the other constituents comprise
   one or more C—H-acidic compounds, and/or
   a solvent selected from the group consisting of fatty acid alkyl esters, alkyl silicates, alkyl silicate oligomers and mixtures thereof.

4. The phenolic resin composition as claimed in claim 3, wherein at least one of the one or more C—H-acidic compounds has the same structure as the C—H-acidic reactant compound of the or of one of the reaction products.

5. The phenolic resin composition as claimed in claim 3, wherein the or at least one of the C—H-acidic reactant compounds is a carbonyl compound capable of enolate formation.

6. The phenolic resin composition as claimed in claim 3, wherein the or at least one of the C—H-acidic reactant compounds is selected from the group consisting of dialkyl malonate.

7. The phenolic resin composition as claimed in claim 3, comprising
- an ortho-condensed phenolic resol having etherified and/or free methylol groups in a total amount of from 40 to 60% by weight,
- free formaldehyde in an amount of less than 0.1% by weight based on the total mass of the phenolic resin composition,
- one or more reaction products of formaldehyde with one or more C—H-acidic reactant compounds,
- other constituents in a total amount of at least 38% by weight,
- wherein the other constituents comprise
- a solvent selected from the group consisting of fatty acid alkyl esters, alkyl silicates, alkyl silicate oligomers and mixtures thereof.

8. The phenolic resin composition as claimed in claim 3 wherein the ortho-condensed phenolic resol has a ratio of the total amount of etherified and/or free methylol groups to aromatic rings in the range from 0.2:1 to 2:1.

9. A two-component binder system for use in the polyurethane cold-box and/or no-bake process, consisting of
- a phenolic resin composition according to claim 1 as a phenolic resin component, and
- a polyisocyanate component comprising a polyisocyanate having at least two isocyanate groups per molecule.

10. A process for producing the phenolic resin composition in claim 1 comprising the steps of:
- producing or providing a base mixture comprising
  - an ortho-condensed phenolic resol having etherified and/or free methylol groups and
  - free formaldehyde in an amount of more than 0.25% by weight,
  - wherein the base mixture contains not more than 2% by weight of water,
- mixing the base mixture with one or more C—H-acidic compounds to afford a reaction mixture and reacting the free formaldehyde with the one or more C—H-acidic compounds to afford one or more reaction products, wherein the C—H-acidic compounds are altogether present in a molar excess based on the total amount of free formaldehyde in the mixture,
- wherein the reaction mixture contains not more than 2% by weight of water,
- and subsequently
- adding other constituents so that the phenolic resin composition results.

11. The process as claimed in claim 10, wherein the production of the base mixture comprises the steps of:
- reacting one or more phenolic monomers with formaldehyde,
- wherein the molar ratio of the total amounts of formaldehyde to phenol monomers is in the range from 1.3:1 to 2:1.

12. The process as claimed in claim 10, wherein the reaction of the free formaldehyde with the one or more C—H-acidic compounds to form one or more reaction products is effected at a temperature in the range from 80 to 126° C.

13. The process as claimed in claim 10, wherein the molar ratio of the total amount of C—H-acidic compounds to the total amount of formaldehyde in the reaction mixture is greater than 2:1.

14. The process as claimed in claim 10, wherein the reaction of the free formaldehyde with the one or more C—H-acidic compounds to form one or more reaction products is at least performed until
- 50 mol % of the free formaldehyde present in the base mixture have reacted, and/or
- in the reaction mixture the proportion of free formaldehyde is less than 0.2% by weight, based on the total mass of the reaction mixture.

15. A process for producing a two-component binder system, as claimed in claim 9, comprising the steps of:
- providing or producing a phenolic resin composition as claimed in claim 1 as a phenolic resin component and
- combining the provided or produced phenolic resin component with
- a polyisocyanate component comprising a polyisocyanate having at least two isocyanate groups per molecule,
- so that the two-component binder system results.

16. A process for producing a feeder, a foundry mold or a foundry core from a molding material mixture, wherein the molding material mixture is bound by means of a two-component binder system as claimed in claim 9.

17. A feeder, foundry mold or foundry core, producible by a process as claimed in claim 15.

18. The phenolic resin composition as claimed in claim 5, wherein the or at least one of the C—H-acidic reactant compounds is a β-dicarbonyl compound.

19. The phenolic resin composition as claimed in claim 3, wherein the or at least one of the C—H-acidic reactant compounds is diethyl malonate or dimethyl malonate.

* * * * *